United States Patent [19]

Vance

[11] 4,238,850
[45] Dec. 9, 1980

[54] TRANSMITTER/RECEIVER FOR SINGLE CHANNEL DUPLEX COMMUNICATION SYSTEM

[75] Inventor: Ian A. W. Vance, Newport, England

[73] Assignee: International Standard Electric Corporation, New York, N.Y.

[21] Appl. No.: 964,764

[22] Filed: Nov. 29, 1978

[30] Foreign Application Priority Data

Dec. 1, 1977 [GB] United Kingdom ............... 50065/77

[51] Int. Cl.³ .............................................. H04B 1/58
[52] U.S. Cl. ....................................... 370/27; 370/24; 370/39
[58] Field of Search ............. 179/15 R, 15 BC, 2 EA; 178/59; 325/60, 47; 343/176, 180, 205, 207, 208; 370/24, 27, 32, 38, 39, 20

[56] References Cited

U.S. PATENT DOCUMENTS

| | | | |
|---|---|---|---|
| 3,267,380 | 8/1966 | Adams | 343/208 |
| 3,353,099 | 11/1967 | Hayasi et al. | 325/60 |
| 3,956,699 | 5/1976 | Leahy | 343/176 |
| 4,028,645 | 6/1977 | Tressa | 343/180 |

*Primary Examiner*—Douglas W. Olms
*Attorney, Agent, or Firm*—James B. Raden; Marvin M. Chaban

[57] ABSTRACT

A transmitter receiver which can be used for a cordless telephone using radio communication. The receiver produces direct conversion from the radio frequency. Local oscillator frequency is modulated by an audio signal to be sent, the modulated signals being passed through a dual splitting and combining network. The splitting network has directional properties for duplex operation. The receiver processes the signals through a differential amplifier to cancel unwanted signals.

4 Claims, 3 Drawing Figures

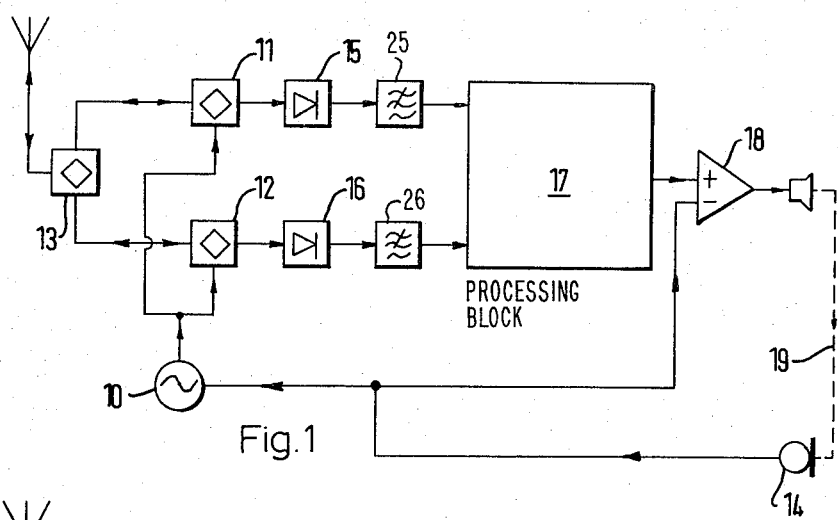
Fig. 1
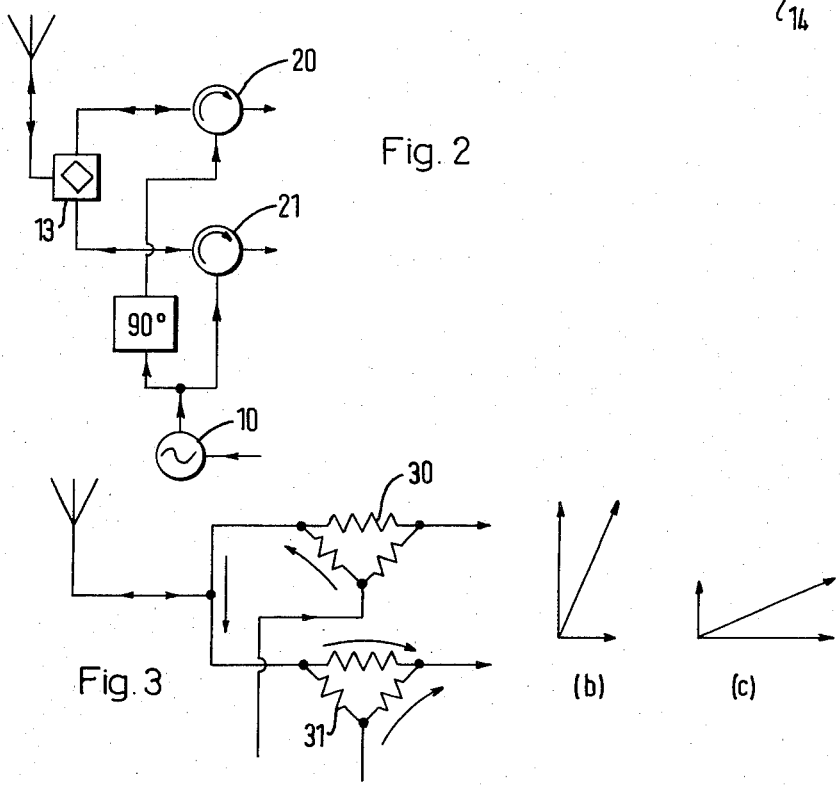
Fig. 2
Fig. 3
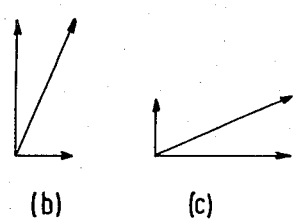
(b)   (c)

TRANSMITTER/RECEIVER FOR SINGLE CHANNEL DUPLEX COMMUNICATION SYSTEM

BACKGROUND OF THE INVENTION

This invention relates to single channel duplex communication systems, and more particularly to portable radio transmitter/receiver equipments.

Many communication systems, especially those connected with the switched telephone network, require a full duplex link. This has traditionally presented problems when a radio link is needed. Solutions either require frequency division of the two paths together with duplexing filters for "2 to 4 wire" splitting, or TDM which can only be easily implemented in systems which are already digital. An immediate application where this problem exists is for so-called "cordless telephones".

SUMMARY OF THE INVENTION

According to the present invention, there is provided a transmitter/receiver for a single channel duplex communication system which includes a local oscillator whose frequency of which is the center frequency of the single channel signals. The output of the local oscillator is modulated with a first audio frequency signal, the output of the local oscillator output is mixed in phase quadrature with received signals frequency modulated with a second audio frequency signal through the first and second mixing means which have an attenuation of the mixedsignals of not less than -15dB relative to the local oscillator output. The mixed outputs of the first and second mixing means are filtered by a low pass filter and amplified to a constant level by an amplifier. Each of the outputs of the amplifier is differentiated and each differentiated output is multiplied with its input to provide the demodulated second audio frequency signal. A proportion of the first audio frequency signal is subtracted from the demodulated signal and the output of the local oscillator is fed in combination with a phase quadrature output of the local oscillator to an aerial via which signals frequency-modulated with the second audio frequency are received.

BRIEF DESCRIPTION OF THE DRAWING

Embodiments of the invention will now be described with reference to the accompanying drawing in which:

FIG. 1 illustrates the general arrangement of a single channel duplex transmitter/receiver; and FIGS. 2 and 3 illustrate alternative arrangements for the transmitter portion of FIG. 1.

DETAILED DESCRIPTION OF THE DRAWING:

In the arrangement of FIG. 1, the receiver portion makes use of a so-called "zero IF" or "direct conversion" method of demodulation. Such a method is described in British Specification Ser. No. 1,530,602 published Nov. 1, 1978 to I. A. W. Vance. In that patent, I have shown the receiver portion of a system in which, local oscillator signals in phase quadrature at the carrier frequency are each separately mixed with the incoming audio modulated signal. The resulting signals have zero I.F. with the two sidebands folded over on each other at the baseband and extending in frequency from DC to the single sideband width of the original signal. The mixer outputs are low pass filtered and then amplified to a standard level. After amplification, the two signals are separately differentiated. Each differentiated signal is then multiplied by the input to the other differentiator and one of the multiplier outputs is subtracted from the other.

In the present invention, the local oscillator is also used for the transmitter. To achieve this, it is necessary to provide a dual splitting/combining network with some directional properties, as shown in FIG. 1. The local oscillator 10 feeds two hybrid circuits 11, 12 which have isolation between the local oscillator ports and the output ports. By means of the inherent non-perfect balance of such hybrids, or by deliberate reflections at the input port, a fraction of the oscillator signal is passed into the receiver. If, for example, 20 dB of isolation is achieved, and the oscillator power is 200 mW in each arm, then 2 mW will pass into each side of the receiver. The remaining power is then equally split between the input port and the load. The two inputs are coupled to the aerial via another hybrid 13 which has the property of isolating the output of hybrid 11 from that of hybrid 12 and of performing a 90° phase shift of one with respect to the other. The oscillator signal thus arrives at the aerial at a level of 100 mW (100 mW each from 11 and 12, added in quadrature) and has been frequency modulated with the transmit information from microphone 14. Received signals pass through hybrid 13 suffering no attenuation, and enter 11 and 12 in quadrature. With 3 dB loss, they join the -20 dB local oscillator signal and are mixed in two single ended mixers, 15, 16. The difference signals are filtered out in filters 25 and 26 and processed in the processing block 17 in the manner outlined in the British Specification previously cited. The signal output from block 17 will now consist of both the incoming modulation and that of the local oscillator. The latter is cancelled in a differential audio output amplifier 18 with a local link (or indeed in the demodulator or elsewhere). A balance of say, 20 dB should be adequate and easily obtainable.

There clearly exists a potentially regenerative acoustic feedback path 19 in this system (or any duplex system) but, if the levels and sensitivities are set to be the same as, for example, in a normal wired telephone system, then the acoustic isolation of the handset must be sufficient to ensure stability. That is, the conditions at the handset are unchanged.

A large variety of alternative configurations exist for the oscillator/aerial/receiver connection and splitting circuits. Two possibilities are shown in FIGS. 2 and 3. In FIG. 2, circulators 20, 21 are used to avoid the 3 dB loss in the hybrids 12 and 11 while FIG. 3 shows a lossier but much cheaper system using resistive splitting networks 30, 31. In this case, as the isolation is small, some additional phase shift of the two local oscillator channels is implied as shown in 3(b) and 3(c). This is not a problem with a system such as the zero IF receiver where exact phase quadrature is not a necessity. There are clearly some limitations on the performance obtainable with this type of system. The transmit power is limited by the isolation of the splitting system together with the power required by the mixer. This limit is of the order of 1mK to 1 watt. The receiver sensitivity is also limited as an RF amplifier cannot be used, and there is some loss in the splitting/combining arrangements. However, the mixer can be low loss and the following circuits sensitive. Overall, a noise figure of say, 15 dB should be obtainable.

A great many applications lie within these limitations. For example, cordless telephone operating within a subscriber's premises only need a few milliwatts of transmitted power together with receivers of moderate sensitivity.

It may be noted that in this type of application, low power is also a necessity to enable the re-use of the same frequency at the minimum distance.

For the method described, the peak frequency deviation out of the mixers is the sum of the peak local oscillator and input signal deviations. Thus, the low pass filters and the receiver pre-detection noise bandwidth are required to be twice as large as a non-duplex receiver. Therefore, more bandwidth than one channel would need to be allocated, eventhough the transmitted signal only occupies the standard spectrum bandwidth.

I claim:

1. A transmitter/receiver for a single channel duplex communication system including a local oscillator for generating a frequency which is the center frequency of the single channel signals, means for frequency modulating the frequency output of said local oscillator with a first audio frequency signal, first and second means for directionally combining the local oscillator output in phase quadrature with audio frequency modulated signals received from the single channel, whereby a major portion of the local oscillator output is transmitted from each combining means to the single channel and a minor portion of the local oscillator output together with the received signals is applied from each combining means to first and second mixing means respectively, means for low pass filtering each of the outputs of the first and second mixing means, means for amplifying each of the outputs of the low pass filtering means to a constant level, separate means for differentiating each of the outputs of the amplifying means, means for multiplying the output of each differentiating means with the input of another differentiating means to provide (a) demodulated second audio frequency signal, signal means for subtracting a proportion of the first audio frequency signal from the demodulated second signal and means for feeding the output of the local oscillator in combination with a phase quadrature output of the local oscillator through said combining means to an aerial via which signals which are frequency-modulated with the second audio frequency are received.

2. A transmitter/receiver according to claim 1, in which the combining means between the oscillator and the first and second mixing means are hybrid circuits which have isolation between the ports to the local oscillator (ports) and ports to the output (ports) of the transmitter/receiver.

3. A transmitter/receiver according to claim 1, in which the combining means between the oscillator and the first and second mixing means are circulators.

4. A transmitter/receiver according to claim 1, in which the combining means between the oscillator and the first and second mixing means are resistive splitting networks.

* * * * *